April 16, 1946.   G. R. READING   2,398,557
METHOD OF PREPARING ALUMINUM CHLORIDE CATALYST
Filed Feb. 23, 1942   3 Sheets-Sheet 1

INVENTOR
GEORGE R. READING

April 16, 1946. G. R. READING 2,398,557
METHOD OF PREPARING ALUMINUM CHLORIDE CATALYST
Filed Feb. 23, 1942 3 Sheets-Sheet 2

INVENTOR
GEORGE R. READING
BY Hudson, Young & Yinger
ATTORNEYS

April 16, 1946. G. R. READING 2,398,557
METHOD OF PREPARING ALUMINUM CHLORIDE CATALYST
Filed Feb. 23, 1942 3 Sheets-Sheet 3

INVENTOR
GEORGE R. READING
BY
ATTORNEYS

Patented Apr. 16, 1946

2,398,557

UNITED STATES PATENT OFFICE 2,398,557

METHOD OF PREPARING ALUMINUM CHLORIDE CATALYST

George R. Reading, Bartlesville, Okla., assignor to Phillips Petroleum Company, a corporation of Delaware Application February 23, 1942, Serial No. 432,091

5 Claims. (Cl. 252—259.2)

This invention relates to a method for the preparation of an aluminum chloride catalyst and more particularly to a method for preparing such a catalyst in a shaped porous form.

Aluminum chloride is a commonly used catalyst in organic reactions and especially in hydrocarbon conversion processes such as alkylation, isomerization, cracking, reforming, polymerization, condensation, reactions of the Friedel-Crafts type, etc. It has, up to the present time, been used in two forms. One is the ordinary commercially obtainable powdered material and the other is the form resulting when this powder is melted to a liquid, allowed to solidify and broken up into lumps resembling crushed limestone and varying in size from say one-half to four inches.

Numerous objections arise in the use as a catalyst of aluminum chloride in the physical forms just described. Neither form is well adapted to use as a stationary contact bed through which the reactants pass, the powdered form because it is relatively impervious en masse and is floated away by the reactants and the fused form because of its small surface area and the relative imperviousness of the individual lumps to the reactants.

The principal object of the present invention is to provide a method for preparing an aluminum chloride catalyst of greatly enhanced effectiveness. Another object is to provide a porous aluminum chloride catalyst. Still another object is to devise a new and useful method of making such porous aluminum chloride catalyst. Numerous other objects will more fully hereinafter appear.

Figure 1:
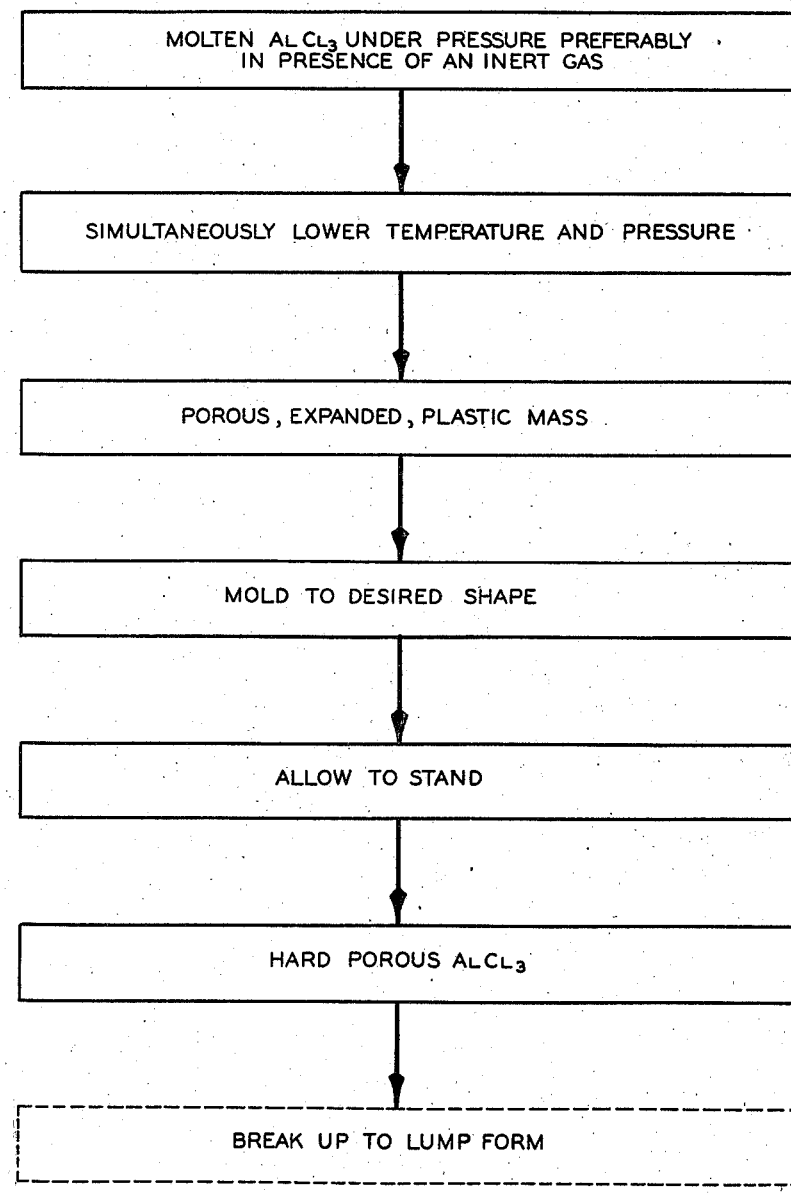
Fig. 1 illustrates diagrammatically one mode of practicing my invention. Steps which are optional are enclosed in dotted lines.

I have discovered that aluminum chloride may be rendered porous and that the product is much superior as a catalyst to the forms of aluminum chloride now used commercially, on account of its much greater contact surface.

I have found that by treatment of aluminum chloride under suitable conditions involving its fusion, a porous strong form of aluminum chloride may be obtained. For example, by melting aluminum chloride at temperatures of from about 195° to about 300° C. under a pressure sufficient to prevent excessive volatilization of the aluminum chloride, generally a moderate pressure of say from about 50 to about 300 lbs. per sq. in. gage, and quickly reducing the temperature and pressure, the aluminum chloride is converted to a porous or spongy plastic mass. This plastic mass may be shaped into any desired form without destruction of its porosity. The mass hardens in a short time, the hardened mass retaining its porosity, although losing some of its plasticity.

While specific temperatures and pressures have been given, the invention is by no means limited thereto since other temperatures and pressures may also be satisfactory if chosen in proper relation to each other.

In the first step of the process it is preferred to use a suitable gas under pressure in contact with the molten aluminum chloride, although if desired such a gas may be dispensed with, relying on the pressure exerted by the volatilized aluminum chloride in the closed treating vessel to prevent boiling or excessive vaporization of aluminum chloride from the molten mass. However, it is usually preferred to fill the vessel in which the fusion is effected with a suitable gas that has no substantial deleterious effect upon the essential or catalytic characteristics of aluminum chloride. The gas used is preferably inert with respect to both aluminum chloride and the reaction to be later catalyzed therewith, although obviously I may use a gas capable of acting as a promoter for aluminum chloride, such as, for example, hydrogen chloride, hydrogen bromide and hydrogen iodide. I prefer to use hydrogen chloride because of its ready availability and because it acts as a promoter for aluminum chloride in the subsequent conversion. The gas used may react with, that is, add to, the aluminum chloride, as may be the case with hydrogen halides, provided the catalytic activity of the aluminum chloride is not affected adversely. Examples of other suitable gases are nitrogen, chlorine, hydrogen, methane, etc. The carbon oxides, namely, carbon monoxide and dioxide, may be excluded from use under certain circumstances such as under conditions favoring reaction with aluminum chloride, converting it to aluminum oxide and possibly forming carbonyl chloride and other compounds. Oxygen is normally not desirable since it may convert aluminum chloride to aluminum oxide. Normally gaseous hydrocarbons higher than methane, such as ethane, ethylene, propane, propylene, etc., may be ineffective to produce the result described herein by reason of reaction with aluminum chloride. The gas which is used in this manner should be one which is gaseous at ordinary atmospheric temperatures and pressures and should be substantially completely anhydrous.

Whether or not a gas is used, the aluminum chloride may contribute substantially to the pore formation. Thus when the pressure on and temperature of a molten mass of aluminum chloride are quickly reduced, the aluminum chloride tends to sublime, forming pores as it passes from the superheated liquid state to the solid state, provided the proper relation of temperature and pressure is maintained during the step.

Apparently the plastic mass of aluminum chloride obtained is an allotropic form of aluminum chloride since, while it may be readily molded and shaped at atmospheric temperature for a short time after its preparation, it slowly hardens to a solid state. As far as I am aware this apparently allotropic modification of aluminum chloride has never been described in the literature.

The term "plastic" is used herein to refer to the soft and putty-like characteristics which are possessed by the apparently allotropic modification of aluminum chloride, as distinguished from the properties of the other known forms of aluminum chloride hereinbefore referred to and the hard form to which the soft plastic mass changes slowly on standing. The plastic aluminum chloride may be either porous or non-porous, depending upon the rate at which the pressure has been released on the molten mass during the quick chilling or cooling thereof. To obtain the plastic modification of aluminum chloride, quick or rapid chilling or cooling of the mass which has been melted under pressure is essential, as herein stated. The plastic form of aluminum chloride, which may be molded like putty when cold, is coherent but is not rubbery or elastic, however, and after a period of hours changes over into a hard coherent form which is not as soft and cannot be molded as readily under the pressure of the fingers. On hardening, the plastic aluminum chloride does not contract or expand noticeably but, although it retains substantially the form it possessed when it was molded, it acquires more definitely crystalline characteristics than the plastic form possessed.

Apparently the gas used is dissolved in and possibly also carried by occlusion into the molten mass of aluminum chloride under pressure and upon release of this pressure this gas is released, forming bubbles or pores. Preferably the mass is simultaneously cooled sufficiently to retain gas bubbles in the resulting plastic mass to a sufficient extent to produce the desired porosity.

The mechanical strength of the ultimate product may vary with porosity, the exceedingly porous material occasionally having insufficient strength for some purposes. The porosity of the product will vary with the rate of release of pressure, being greater the more rapid the release of pressure.

Simultaneously with the reduction of pressure it is desirable to control the temperature in such relationship to the reduction of the pressure that the desired pore formation is obtained and that the resulting pores are retained in the mass.

The process of the present invention is carried out at a temperature above the critical temperature of the gas used in conjunction with the melted aluminum chloride.

Referring now to Fig. 1 of the drawings, it will be seen that my process may comprise the steps of first preparing a molten mass of aluminum chloride under pressure and preferably in the presence of a gas of the type described above and then simultaneously lowering the temperature of and the pressure upon this molten mass to convert it to porous expanded form. Upon cooling there is obtained a plastic porous mass. Advantage may be taken of the plasticity which this form of aluminum chloride has when first prepared to mold it into any desired shape such as pellets, saddles, rings, discs, etc.

Upon standing for a few hours the material hardens and any shape impressed upon it will be permanently retained. Use of such regular geometrical shapes minimizes packing in a catalyst chamber, and results in low pressure drop through a catalyst bed.

If desired the hard porous aluminum chloride mass may finally be crushed or broken to any desired size or form.

Figures 2, 3, 4:
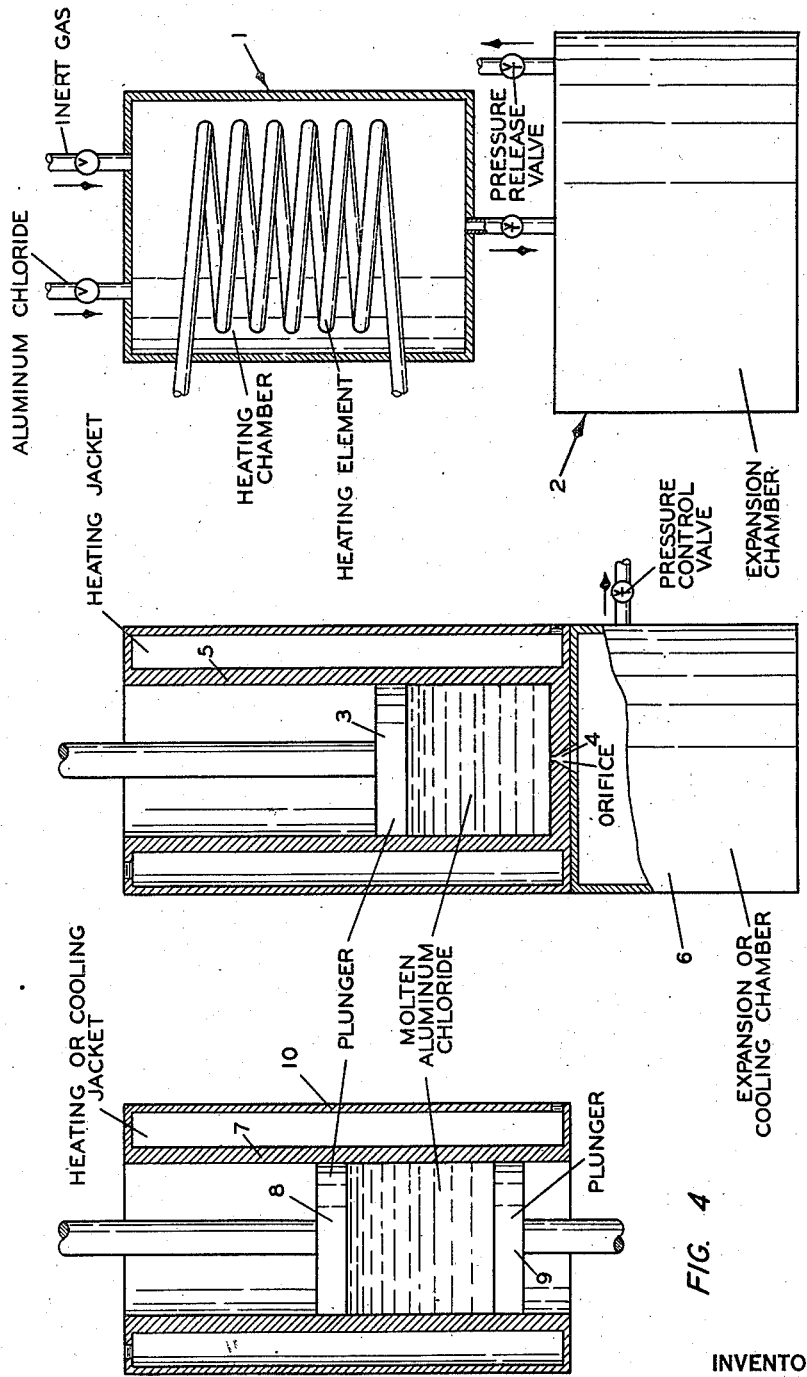
Fig. 2 illustrates diagrammatically one form of equipment which may be used in carrying out my invention.
Fig. 3 illustrates another form of apparatus useful in carrying out my invention.
Fig. 4 illustrates a still further type of equipment which may be employed.

Referring to Fig. 2, there is shown apparatus I for forming a mass of molten aluminum chloride under pressure in contact with a gas and while in this state ejecting it into a chamber 2 where expansion can be effected.

In Fig. 3, a mass of aluminum chloride may be melted under pressure of a plunger 3 and, if desired, with a suitable amount of a gas and extruded under pressure of the plunger 3 through an orifice 4 which has been opened in the end of the cylinder 5 into a chamber 6 where expansion occurs as before.

In Fig. 4, there is shown apparatus whereby a mass of aluminum chloride may be charged to a cylinder 7 fitted with two plungers 8 and 9, heat and pressure being applied until molten. A suitable amount of a gas such as hereinabove specified should be present in contact with or dispersed through the aluminum chloride. One plunger 8 is now suddenly withdrawn and the mass is quickly cooled in the expanded form as by passing a cooling medium through the jacket 10. The cooled mass is then pushed out with the second plunger 9.

In catalytic reactions, especially isomerization and alkylation, as well as in other catalyzed organic reactions, the surface of the catalyst is an important factor. Catalysts have heretofore often been placed on inert supporting materials in order to increase the surface. The porous form of aluminum chloride described herein has unusual catalytic activity because of its highly extended surface and its spongy nature. Since it also has reasonably good structural strength, it is possible to use it directly as a catalyst without an inert support.

The aluminum chloride preferably is completely anhydrous and maintained from contact with water or moisture during the entire treatment. After preparation, suitable precautions should be taken to keep it anhydrous and to protect it from extended deleterious contact with atmospheric air or other source of moisture. The gas used to produce the desired pressure over the molten aluminum chloride during the preparation, as hereinbefore mentioned, should also be substantially completely anhydrous.

The product prepared in accordance with the present invention has an apparent density of not over about 80% of that of ordinary lump, fused aluminum chloride. The apparent density may be much lower than this down to even as low as about 30% of lump, fused material. The product is porous in the true sense, that is, it is spongy. The cells are interconnecting so that reactants may pass completely through a lump or molded shape of the product. This is apparently because the bubbles of gas formed in the treatment expand during the release of pressure and continue to do so until they merge with one another and reach the exterior surface of the molten mass. This type of product is to be distinguished from a truly cellular material wherein the gas cells or pockets do not interconnect. Such a truly cellular material without interconnecting pores, while light in weight and a good heat insulator, would, because of its impervious nature, not be particularly advantageous as a catalyst unless crushed rather finely to expose the highly extended surface.

The cooling should be carried to a point below the solidification point of the molten aluminum chloride, usually to at least about 180° C. and generally to at least about 100° C. down to about atmospheric temperature. Shaping of the plastic porous mass may be facilitated somewhat by the use of moderately elevated temperatures insufficient to cause consolidation or compaction under the desirably moderate shaping pressure employed.

Likewise the release of pressure is preferably carried to substantially atmospheric, although depending upon the rapidity of cooling, the cooling curve (time-temperature), and the temperature to which the mass is cooled, it may occasionally be carried to pressures somewhat above atmospheric but substantially below the pressure attained before release of pressure and cooling.

It is preferred never to draw a vacuum upon the aluminum chloride during the treatment where so doing would cause individual cells under reduced pressure to form. Such cells are undesirable because they are not interconnecting with one another and do not extend to the surface so that the mass obtained is not of maximum utility as a catalyst material. Also such cells may contract upon exposure of the mass, either in plastic or in liquid form, to atmospheric pressure. Where it is possible to draw a vacuum on the mass during the processing and produce a porous mass, such a step may be practiced without departing from the spirit of the inventive concept.

The time of cooling and release of pressure will vary widely depending upon the inter-relation of temperature and pressure during the process and numerous other factors, as will be obvious to those skilled in the art. In general it will not exceed about 30 minutes and may vary therefrom down to the point where release is substantially instantaneous, i. e., taking place in from about one-tenth of a second to about 5 seconds. As stated above, the rapidity of release of pressure and of cooling will influence porosity and structural strength or crushing resistance of the product. Selection of suitable time of cooling, time of release of pressure, and values of temperature and pressure will be within the skill of the art in the light of my disclosure.

With regard to apparatus useful for carrying out my process, I may, when operating batchwise, use a bomb or other suitable pressure-resisting vessel equipped with means for releasing the pressure and for simultaneously cooling. To cool the bomb I may remove it from immersion in the heating medium. Or it may be cooled by a suitable heat-exchange medium circulated in a jacket or the like in place of the heating medium used to effect melting.

Or I may use a plunger and cylinder analogous to the arrangement used in injection molding of plastics. Also I may use an extrusion type of apparatus equipped with a screw for forcing the melted material through an orifice and with suitable means for exerting the desired gaseous and/or mechanical pressure upon the melted aluminum chloride. Such a device might be similar to the extrusion molding equipment used in handling plastic and synthetic resins.

Figures 5, 6:
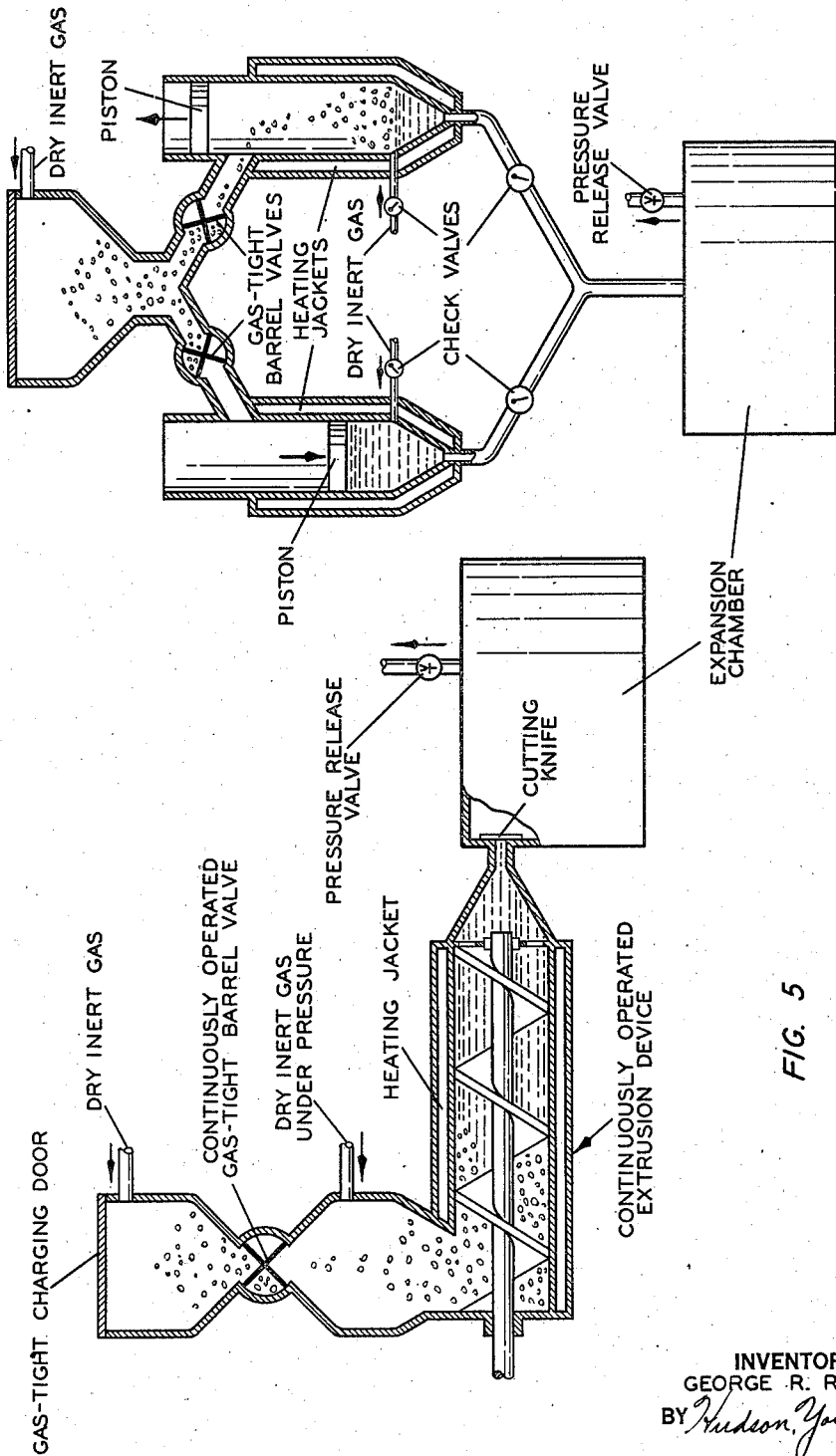
Figs. 5 and 6 illustrate diagrammatically forms of equipment adapted for continuously carrying out the process of my invention.

Instead of operating in a batchwise manner, I may carry out my process continuously in suitable apparatus designed for the purpose. Thus when using an extrusion machine equipped with a pressing screw rotated continuously, I may make provision for feeding powdered or molten aluminum chloride into the machine without disturbing the pressure maintained in it and in this way operate continuously. An example of such equipment is shown in Fig. 5. Or I may use a plurality of injection plungers operating in injection cylinders connected to a common expansion orifice and alternately pushed in and retracted for a new charge. Such an arrangement is illustrated in Fig. 6. Or I may use suitable pumping equipment for continuously melting aluminum chloride and pumping it under pressure into a suitable expansion chamber.

Example 1

A lot of powdered commercial grade aluminum chloride was placed in a bomb in an atmosphere of dry nitrogen. The initial pressure was 20 lbs. per sq. in. gage. It was heated to 400° F. and held at that temperature for one hour, the bomb being kept sealed. The maximum pressure attained was 212 lbs. per sq. in. gage. The bomb was then removed from the heating bath and allowed to cool down in the atmospheric air, the pressure being bled off to atmospheric during the first 30 minutes of this cooling. After the bomb and its contents attained atmospheric temperature, it was opened. The product was a soft porous lump. When taken out and allowed to stand for 24 hrs. in a stoppered bottle to keep out atmospheric moisture, it hardened to a rigid material retaining the porosity of the plastic mass and having reasonable mechanical strength. The product had an apparent density substantially below that of regular fused aluminum chloride and was a hard spongy material.

Example 2

The same procedure as described in Example 1 was followed except that during the heating period the pressure in the bomb was kept from rising above 50 lbs. per sq. in. gage by bleeding off the pressure to this figure while heating. As before, this 50 lbs. pressure was bled off during the first 30 minutes of the cooling period. A product identical, to all purposes and intents, with that of Example 1 was obtained.

Example 3

Example 1 was duplicated exactly except that the pressure was bled off over a 2-hour period instead of one-half hour as in that example. The product was temporarily plastic as before but was not discernibly porous.

*Example 4*

A reaction tower was packed with the hardened porous catalyst prepared as described in Example 1. Dry n-butane in admixture with about 10% by weight of anhydrous hydrogen chloride was passed therethrough under isomerizing conditions of temperature, contact time and pressure. The n-butane was isomerized to isobutane in yields of approximately 50%.

The invention is not to be taken as limited by the illustrative details given in the foregoing description and in the drawings but only as contemplated by the spirit and the terms of the appended claims.

Thus, my invention may be considered to involve the preparation of plastic aluminum chloride, whether porous, as a result of having been prepared in the manner described in detail above, or non-porous. For example, I may rapidly, say in 30 minutes or less down to instantaneously, cool a molten mass of aluminum chloride to a point below its solidification point and below its subliming point if at atmospheric pressure and ranging therefrom down to say 100° F. or below down to atmospheric temperature. This cooling may or may not be accompanied by rapid or slow release of elevated pressure if such elevated pressure is used. In this way there is formed a new plastic form of aluminum chloride which can be readily molded or shaped at atmospheric temperature and which has the remarkable property upon standing for a substantially prolonged period of time, say 24 hours, of hardening to a rigid non-plastic friable or brittle mass.

It will be understood that materials of construction suitably resistant to molten aluminum chloride will be used in the construction of apparatus for carrying out the present invention.

I claim:

1. A process of producing a shaped body of aluminum chloride, which comprises melting aluminum chloride at a pressure substantially greater than atmospheric but not substantially greater than approximately 300 pounds per square inch gage, thereafter rapidly cooling said mass to approximately atmospheric temperature within a period not substantially in excess of 30 minutes, whereby the aluminum chloride is obtained as a soft, plastic, coherent mass, shaping said plastic mass into the desired shape before it changes to the hard form, and permitting said shaped mass to become transformed to the hard form by standing.

2. A process of producing a shaped body of aluminum chloride suitable for use as a catalyst, which comprises heating aluminum chloride at a temperature in excess of its melting point in an atmosphere of a gas that has substantially no deleterious effect upon the catalytic activity of aluminum chloride at a pressure substantially greater than atmospheric but not substantially greater than approximately 300 pounds per square inch gage, thereafter rapidly cooling said mass to approximately atmospheric temperature, whereby the aluminum chloride is obtained as a soft, plastic, coherent mass, shaping said plastic mass at substantially atmospheric temperature into the desired shape before it changes to the hard form, and permitting said shaped mass to become transformed to the hard form by standing.

3. A process of producing a shaped body of porous aluminum chloride suitable for use as a catalyst, which comprises heating aluminum chloride at a temperature in excess of its melting point in an atmosphere of a gas that has substantially no deleterious effect upon the catalytic activity of aluminum chloride at a pressure substantially greater than atmospheric but not substantially greater than approximately 300 pounds per square inch gage, thereafter rapidly cooling said mass to approximately atmospheric temperature while gradually releasing the pressure thereon, whereby the aluminum chloride is obtained as a soft, plastic, coherent, porous mass, shaping said plastic mass into the desired shape before it changes to the hard form, and permitting said shaped mass to become transformed to the hard form by standing.

4. A process of producing a shaped body of porous aluminum chloride, which comprises heating molten aluminum chloride in an atmosphere of hydrogen chloride at a pressure substantially greater than atmospheric but not substantially greater than approximately 300 pounds per square inch gage, thereafter rapidly cooling said mass to approximately atmospheric temperature within a period not substantially in excess of approximately 30 minutes, while gradually releasing the pressure thereon, whereby the aluminum chloride is obtained as a soft, plastic, coherent, porous mass, shaping said plastic mass into the desired shape before it changes to the hard form, and permitting said shaped mass to become transformed to the hard form by standing.

5. A process of producing a shaped body of porous aluminum chloride suitable for use as a catalyst, which comprises heating aluminum chloride at a temperature in excess of its melting point in an atmosphere of nitrogen at a pressure substantially greater than atmospheric but not substantially greater than approximately 300 pounds per square inch gage, thereafter rapidly cooling said mass to approximately atmospheric temperature within a period not substantially in excess of 30 minutes while gradually releasing the pressure thereon, whereby the aluminum chloride is obtained as a soft, plastic, coherent, porous mass, shaping said plastic mass into the desired shape before it changes to the hard form, and permitting said shaped mass to become transformed to the hard form by standing.

GEORGE R. READING.